(12) United States Patent
Jackson (10) Patent No.: US 9,273,714 B2
(45) Date of Patent: Mar. 1, 2016

(54) SYSTEM AND METHOD OF INSTALLING AND REMOVING A TEMPORARY CONCRETE BARRIER FROM A BRIDGE DECK

(71) Applicant: Fitzhugh Lee Jackson, Hope Hull, AL (US)

(72) Inventor: Fitzhugh Lee Jackson, Hope Hull, AL (US)

( * ) Notice: Subject to any disclaimer, the term of this patent is extended or adjusted under 35 U.S.C. 154(b) by 230 days.

(21) Appl. No.: 14/046,198

(22) Filed: Oct. 4, 2013

(65) Prior Publication Data

US 2015/0096665 A1 Apr. 9, 2015

(51) Int. Cl.
| | |
|---|---|
| *F16B 39/10* | (2006.01) |
| *E01D 19/10* | (2006.01) |
| *E01F 15/04* | (2006.01) |
| *E01F 15/10* | (2006.01) |
| *F16B 13/14* | (2006.01) |
| *E04B 1/41* | (2006.01) |
| *E04G 21/18* | (2006.01) |
| *E01F 15/02* | (2006.01) |

(52) U.S. Cl.
CPC ............ *F16B 39/108* (2013.01); *E01D 19/103* (2013.01); *F16B 13/141* (2013.01); *E01F 15/02* (2013.01); *E01F 15/0484* (2013.01); *E04B 1/4121* (2013.01); *E04G 21/185* (2013.01)

(58) Field of Classification Search
CPC ... F16B 39/108; F16B 13/141; E01D 19/103; E04B 1/415; E04B 1/4114; E04B 1/4121; E04G 21/185; E01F 15/0484; E01F 15/10; E01F 15/02
See application file for complete search history.

(56) References Cited

U.S. PATENT DOCUMENTS

| | | | | |
|---|---|---|---|---|
| 1,080,752 | A * | 12/1913 | Edwards | ............... F16B 39/108 411/123 |
| 4,642,964 | A | 2/1987 | Kellison | |
| 4,954,009 | A | 9/1990 | Kellison | |
| 5,562,377 | A | 10/1996 | Giannuzzi et al. | |
| 5,618,143 | A * | 4/1997 | Cronin, II | ............... B25B 13/48 411/120 |
| 5,733,083 | A | 3/1998 | Heminger | |
| 5,772,373 | A * | 6/1998 | Cronin, II | ............... B25B 13/48 411/120 |
| 6,010,290 | A * | 1/2000 | Slesinski | ............... F16B 39/108 411/226 |
| 6,393,795 | B1 | 5/2002 | Irwin et al. | |
| 6,666,636 | B2 | 12/2003 | Warmolts et al. | |

(Continued)

OTHER PUBLICATIONS

Alabama Department of Transportation (ALDOT) List 11-15: Concrete Anchoring Systems, revised Jan. 5, 2015 (3 pages).*

*Primary Examiner* — Rodney Mintz
(74) *Attorney, Agent, or Firm* — Waller Lansden Dortch & Davis LLP; Larry W. Brantley (57) ABSTRACT

A system for installing and removing a temporary concrete barrier from a bridge deck includes a bolt, a star washer, a flat washer, a two-part sleeve, and a barbed nut. A method of using the system includes the steps of positioning the temporary concrete barrier at a desired location on the bridge deck; drilling a mounting hole in the bridge deck; filling the mounting hole with epoxy; inserting the barbed nut and two-part sleeve into the mounting hole and epoxy; inserting the bolt into the two-part sleeve and the barbed nut; waiting for the epoxy to set, tightening the system so that the temporary concrete barrier is held in place with respect to the bridge deck; loosening the system and removing the concrete barrier when it is no longer needed; and filling the mounting hole with epoxy after the concrete barrier is removed.

18 Claims, 6 Drawing Sheets

(56) References Cited

U.S. PATENT DOCUMENTS

| | | | |
|---|---|---|---|
| 7,927,052 B1* | 4/2011 | Varden | F16B 39/108 411/197 |
| 8,132,389 B2 | 3/2012 | Gee | |
| 2005/0025604 A1* | 2/2005 | Slesinski | F16B 39/103 411/112 |
| 2009/0279950 A1* | 11/2009 | Amengual Pericas | E01F 15/0438 404/10 |
| 2011/0179748 A1* | 7/2011 | Gee | B28B 23/005 52/745.21 |
| 2014/0050550 A1* | 2/2014 | Stempniewski | F16B 13/065 411/360 |
| 2014/0237908 A1* | 8/2014 | Gupta | H01Q 1/1242 52/40 |
| 2015/0101174 A1* | 4/2015 | Williams | F16B 39/108 29/525.05 |
| 2015/0275955 A1* | 10/2015 | Ekmedzic | F16B 39/108 411/221 |

\* cited by examiner

A SYSTEM AND METHOD OF INSTALLING AND REMOVING A TEMPORARY CONCRETE BARRIER FROM A BRIDGE DECK

BACKGROUND OF THE INVENTION

The present invention relates generally to temporary concrete barriers used in the construction industry. More specifically, the present invention pertains to a system and method of installing and removing a temporary concrete barrier from a bridge deck.

Systems and methods for installing and removing temporary concrete barriers from a bridge deck are known in the art. These systems and methods typically involve drilling holes completely through bridge decks and securing temporary concrete barriers to the bridge deck using conventional nuts and bolts. Connecting temporary concrete barriers in this manner, however, can be expensive because the nuts used to secure the barriers must be connected to the bolts on the underside of the bridge deck and expensive lifts are required in order to access this area. This method can also create an unsightly appearance when the bolts are later removed and holes are left in the bridge deck. Thus, there is a need for a system and method of installing and removing temporary concrete barriers from bridge decks that does not suffer from these disadvantages.

SUMMARY OF THE INVENTION

The present invention addresses this need by providing a system and method of installing and removing a temporary concrete barrier from a bridge deck that does not require expensive lifts and does not leave an unsightly appearance after the concrete barriers are removed. In one embodiment, the system includes a bolt, a star washer, a flat washer, a two-part sleeve, and a barbed nut, all of which may be assembled together to secure a temporary concrete barrier to a bridge deck. An exemplary embodiment of the method of the present invention includes the steps of positioning a temporary concrete barrier at a desired location on a bridge deck; drilling a hole in the bridge deck; filling the hole with epoxy; inserting the barbed nut and the sleeve into the hole and epoxy; inserting the bolt through the star washer, flat washer, a mounting hole included in the concrete barrier, and the sleeve, and into the barbed nut; waiting for the epoxy to set; and tightening the system until the concrete barrier is secured to the bridge deck.

When the concrete barrier is no longer needed, the method further includes the steps of loosening and removing the bolt from the sleeve; removing the star and flat washers from the concrete barrier; lifting the concrete barrier off of the sleeve; removing the upper portion of the sleeve from the hole drilled in the bridge deck, leaving the lower portion of the sleeve and the barbed nut in the hole drilled in bridge deck; and filling the hole with epoxy until the epoxy is flush with the surface of the bridge deck.

DETAILED DESCRIPTION OF THE INVENTION

Figure 1:
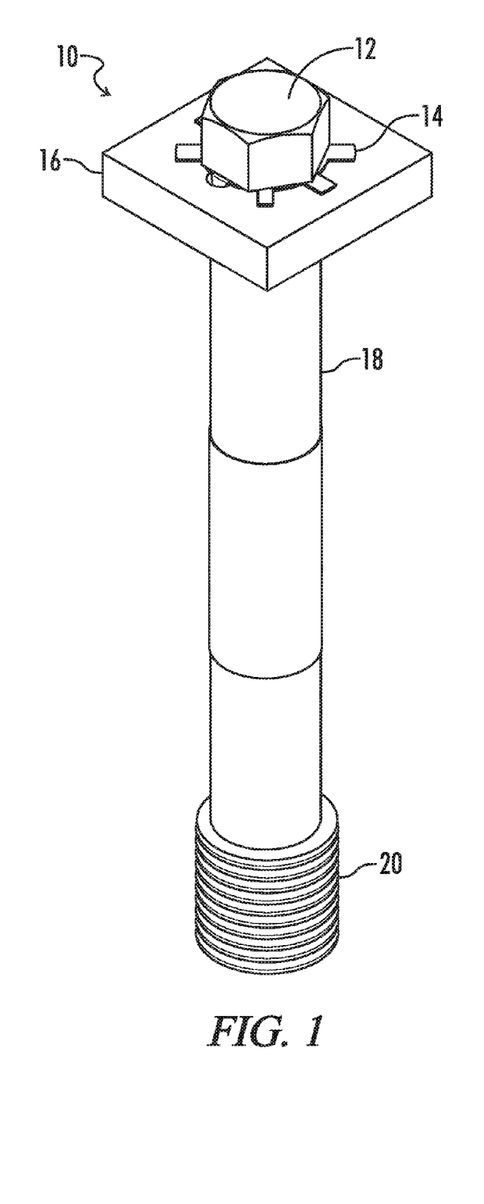
FIG. 1 is perspective view of one embodiment of the system of the present invention.
Figure 2:
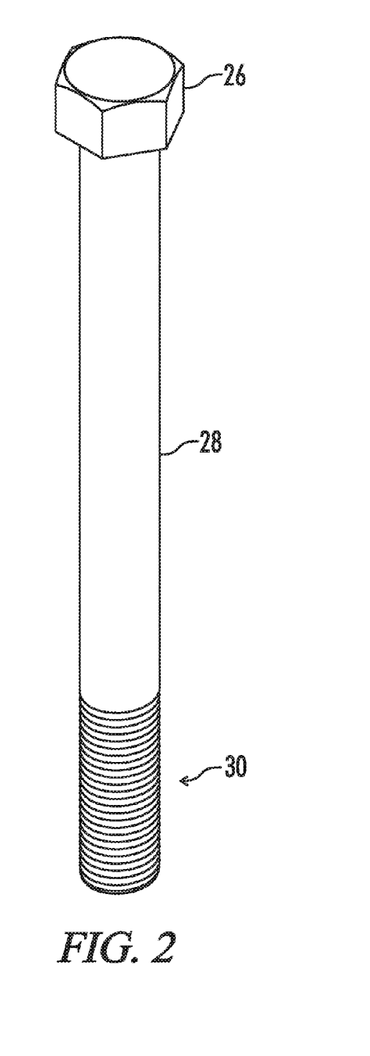
FIG. 2 is a perspective view of the embodiment of the bolt shown in FIG. 1.
Figure 11:
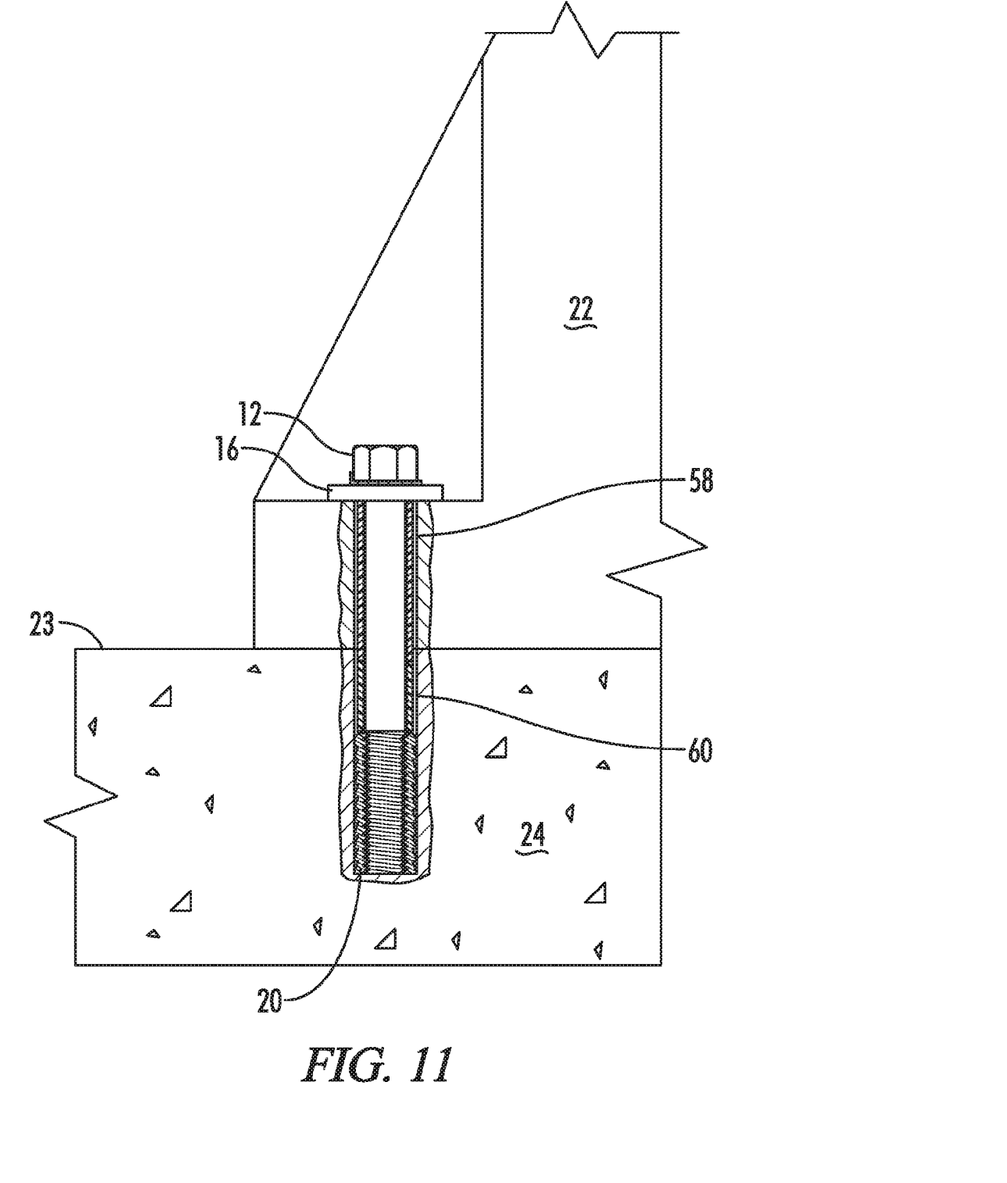
FIG. 11 is a side cut-away view showing a concrete barrier connected to a bridge deck using one embodiment of the system of the present invention.

Referring to FIG. 1, one embodiment of the system 10 of the present invention includes a bolt 12, a star washer 14, a flat washer 16, a two-part sleeve 18, and a barbed nut 20, all of which can be assembled together to secure a temporary concrete barrier 22 (FIG. 11) to a bridge deck 24 (FIG. 11). The bolt 12 (FIG. 2) may include a bolt head 26 having at least one side wall 27 and a bolt shaft 28 having a threaded portion 30. The bolt 12 may be a 1 inch by 10 inch or 1 inch by 12 inch Grade #5 hex bolt. The bolt 12 may vary in length and diameter as needed for a particular application.

Figure 3:
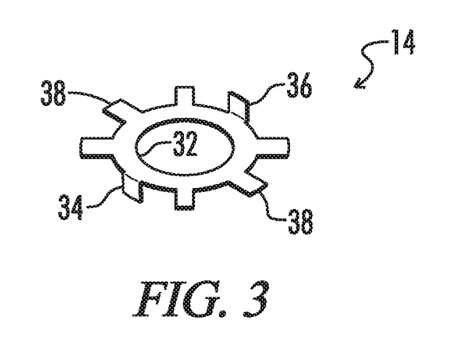
FIG. 3 is a perspective view of the embodiment of the star washer shown in FIG. 1.

The star washer 14 (FIG. 3) may include a circular, flat, inner portion 32, a large, flat, locking tab 34 extending perpendicularly outward from the inner portion 32 in one direction, and a small, flat, locking tab 36 extending perpendicularly outward from the inner portion 32 in the opposite direction. The star washer 14 may also include flat, stop tabs 38 extending outward from the inner portion 32.

Figure 4:
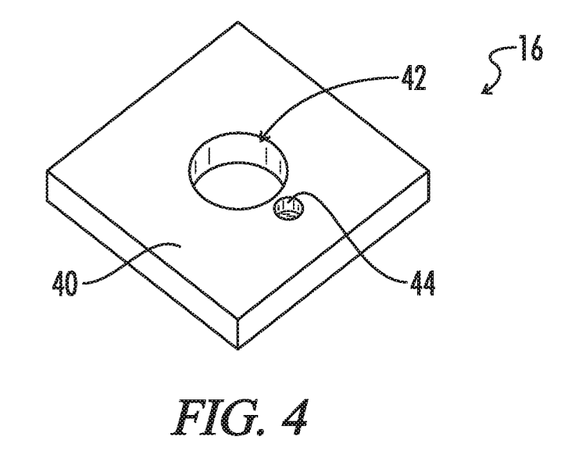
FIG. 4 is a front perspective view of the embodiment of the flat washer shown in FIG. 1.
Figure 5:
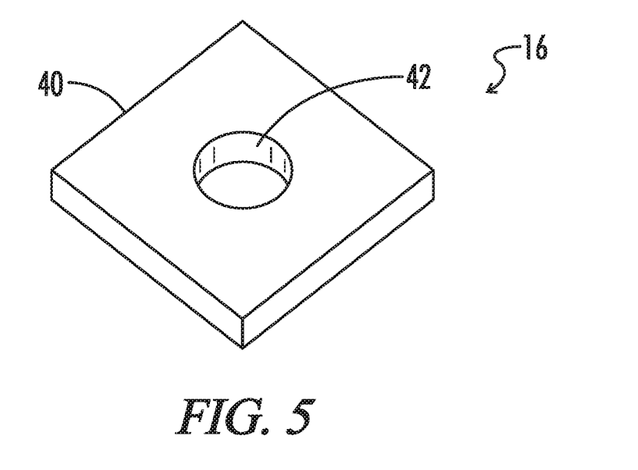
FIG. 5 is a rear perspective view of the embodiment of the flat washer shown in FIG. 1.

Referring to FIGS. 4-5, the flat washer 16 may include a flat, washer body 40 having a bolt shaft opening 42 and a small locking recess 44 for receiving the small locking tab 36. The flat washer 16 may be a ½ inch×3 inch×3 inch flat galvanized square washer. When the bolt 12, star washer 14, and flat washer 16 are assembled together, the small locking tab 36 may be disposed in the locking recess 44 defined in the flat washer body 40 and the large locking tab 34 may be pressed against one side of the bolt head 26.

Figure 6:
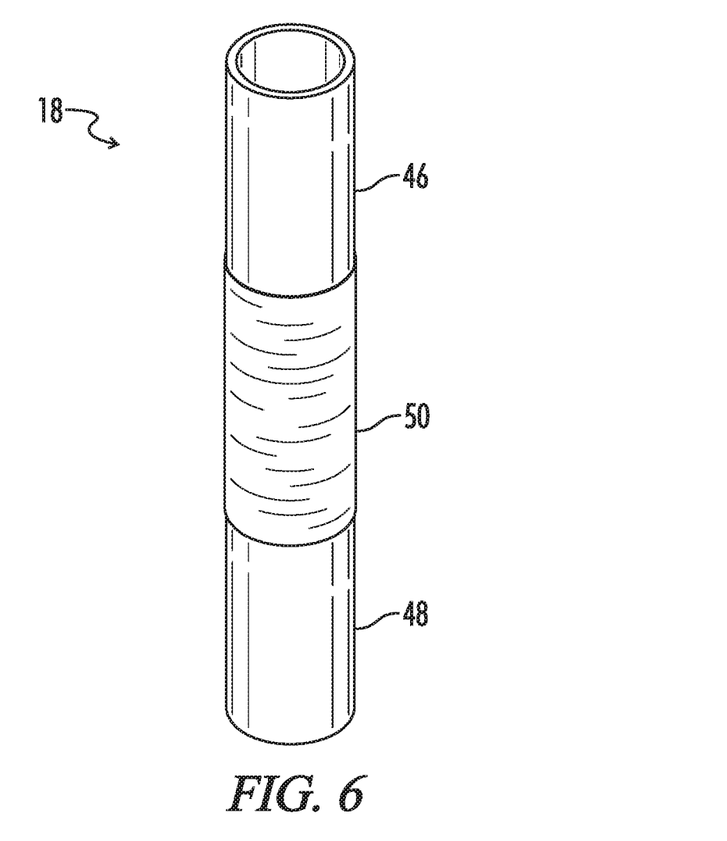
FIG. 6 is a front perspective view of the embodiment of the sleeve shown in FIG. 1.
Figure 7:
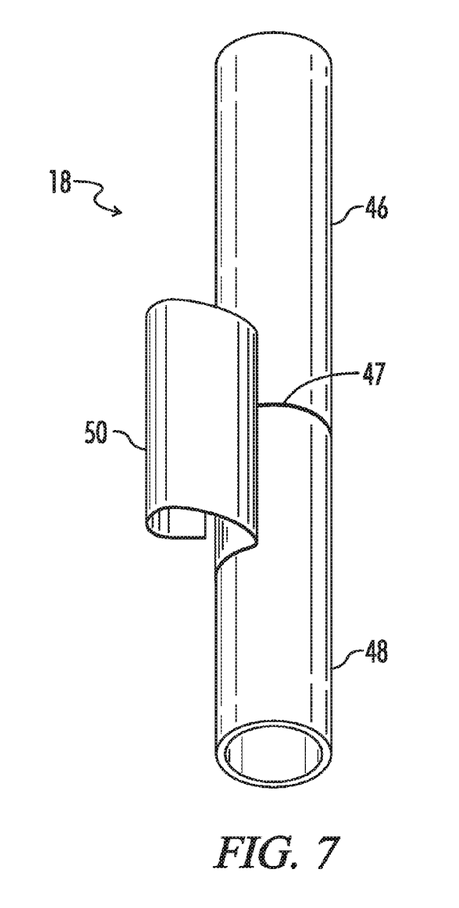
FIG. 7 is another perspective view of the embodiment of the two-piece sleeve shown in FIG. 1.

The sleeve 18 shown in FIGS. 6 and 7 may include an upper portion 46 and a lower portion 48 spliced together using tape 50. Sleeve 18 may be made out of Schedule 40 PVC and have a 1 inch inner diameter.

Figure 8:
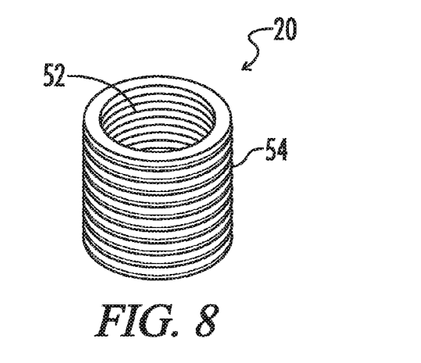
FIG. 8 is a top perspective view of the embodiment of the barbed nut shown in FIG. 1.
Figure 9:
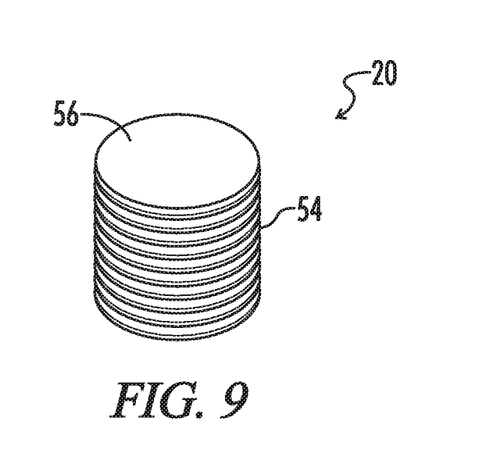
FIG. 9 is a bottom perspective view of the embodiment of the barbed nut shown in FIG. 1.
Figure 10:
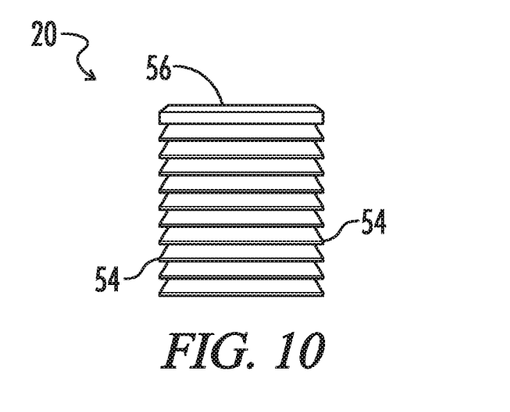
FIG. 10 is a side view of the embodiment of the barbed nut shown in FIG. 1.

As shown in FIGS. 8-10, barbed nut 20 (or barbed anchor 20) may include a nut body 51 having a threaded inner portion 52, barbs 54, and a flat bottom 56. The barbs 54 may extend outward from the nut body 51 at a 30 degree angle. The barbed nut 20 may have a 1½ inch outside diameter.

An exemplary embodiment of the method of using the system 10 to install the concrete barrier 22 on the bridge deck 24 includes the steps of: positioning the concrete barrier 22, which includes at least one mounting opening 58 (FIG. 11), at a desired location on the bridge deck 24; drilling a mounting hole 60 in the bridge deck 24 underneath the mounting opening 58 using the mounting opening 58 as a guide; filling the mounting hole 60 with an epoxy (not shown); inserting the barbed nut 20 into the mounting hole 60 and epoxy; inserting the sleeve 18 into the mounting hole 60 and epoxy so that the upper portion 46 of the sleeve 18 is partially disposed within the mounting opening 58 of the concrete barrier 22 and the mounting hole 60 of the bridge deck 24; inserting the small locking tab 36 on the star washer 14 into the locking recess 44 in the flat washer 16; inserting the bolt shaft 28 through the circular inner portion 32 of the star washer 14, opening 42 of the flat washer 16, sleeve 18, and into the barbed nut 20; partially threading bolt shaft 28 into the threaded inner portion 52 of barbed nut 20; waiting approximately 24 hours for the epoxy to set; and continuing to thread the bolt shaft 28 into the threaded inner portion 52 of barbed nut 20 until the concrete barrier 22 is secured to the bridge deck 24. The method may further include the step of thoroughly cleaning the mounting hole 60 with compressed air.

The concrete barrier 22 may include three mounting openings (not shown) and the concrete barrier 22 may be connected to the bridge deck 24 using a system 10 for each one of the mounting openings. The set time for the epoxy may vary from one application to another and depending on the type of epoxy.

The mounting hole 60 may be filled by injecting the epoxy into the hole 60 and the epoxy may be an approved injection type epoxy from ALDOT List 11-15. The mounting hole 60 may be 5 inches deep and filled with 4 inches of epoxy.

The sleeve 18 may be disposed within the mounting hole 60 so that the splice point 47 (FIGS. 7 and 11) between the upper portion 46 and lower portion 48 of the sleeve 18 may be located 1½ inches below the upper surface 23 (FIG. 11) of the bridge deck 24. The upper portion 46 may be 4 inches in length and the lower portion 48 may be 1 inch in length. The tape 50 may be conventional blue masking or painter's tape.

The sleeve 18 may be disposed in the mounting hole 60 so that the lower portion 48 is partially disposed in the epoxy and the split point 47 and upper portion 46 are not disposed in the epoxy. The length of the upper and lower portions of the sleeve 18 may vary from one application to another. The mounting hole 60 in the bridge deck 24 may have a 1⅝ inch to 1¾ inch diameter. The mounting opening 58 in the concrete barrier 22 may have a 2 inch diameter.

When the concrete barrier 22 is no longer needed, the method further includes the steps of unthreading the bolt shaft 28 from the threaded inner portion 52 of the barbed nut 20; removing the bolt shaft 28 from the sleeve 18; removing the star and flat washers, 14 and 16, from the concrete barrier 22; lifting the concrete barrier 22 off of the sleeve 18; removing the upper portion 46 of the sleeve from the mounting hole 60 drilled in the bridge deck 24; leaving the lower portion 48 of the sleeve and the barbed nut 20 in the mounting hole 60 drilled in bridge deck 22; and filling the mounting hole 60 with epoxy (not shown) until the epoxy is flush with the upper surface 23 of the bridge deck 24. Once again, the epoxy may be an approved injection type epoxy from ALDOT List 11-15.

The above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed is:

1. A system for installing and removing a temporary concrete barrier from a bridge deck, the temporary concrete barrier having at least one mounting opening, the system comprising:
   a bolt having a bolt head and a bolt shaft including a threaded portion;
   a star washer having an inner portion, a large locking tab extending perpendicularly outward from the inner portion, a small locking tab extending perpendicularly outward from the inner portion in an opposite direction, and a plurality of stop tabs extending horizontally outward from the inner portion;
   a flat washer having a washer body including a bolt shaft opening and a locking recess defined on one side of the washer body adjacent to the bolt shaft opening;
   a two-part sleeve including a cylindrical upper portion spliced together with a cylindrical lower portion at a splice point;
   a barbed nut having a nut body including a threaded inner portion and barbs extending outward from the nut body; and
   wherein the inner portion of the star washer is circular and sized to allow the bolt shaft to pass therethrough but to prevent the bolt head from passing therethrough, the bolt shaft opening of the flat washer is sized to allow the bolt shaft to pass therethrough but to prevent the star washer from passing therethrough, the mounting opening defined in the concrete barrier is sized to allow the two-part sleeve and bolt shaft to pass therethrough but to prevent the flat washer from passing therethrough, the locking recess defined in the flat washer is sized to receive the small locking tab of the star washer, the two-part sleeve is sized to receive the bolt shaft, and the threaded inner portion of barbed nut is sized to receive the threaded portion of the bolt shaft.

2. The system of claim 1, wherein:
   the bolt head includes at least one side wall;
   the upper and lower portions of the two-part sleeve are spliced together using tape; and
   the barbs extend outward from the nut body at a 30 degree angle.

3. The system of claim 2, wherein the small locking tab included with the star washer is disposed in the locking recess defined on one side of the washer body.

4. The system of claim 3, wherein the large locking tab included with the star washer is pressed against the at least one side wall of the bolt head.

5. The system of claim 1, wherein the bolt shaft is disposed within the inner portion of the star washer, the bolt shaft opening defined in the flat washer, and the upper and lower portions of the two-part sleeve.

6. The system of claim 5, wherein the threaded portion of the bolt shaft is disposed within the threaded inner portion of the barbed nut.

7. The system of claim 6, wherein the barbed nut is disposed within a mounting hole defined in the bridge deck and partially covered with epoxy included in the mounting hole.

8. The system of claim 7, wherein the two-part sleeve is partially disposed within the mounting hole adjacent to the barbed nut and partially covered with epoxy included in the mounting hole.

9. The system of claim 8, wherein the lower portion of the two-part sleeve is partially covered with the epoxy included in the mounting hole.

10. The system of claim 9, wherein the upper portion of the two-part sleeve is partially disposed within the mounting opening defined in the concrete barrier and the mounting hole defined in the bridge deck.

11. The system of claim 10, wherein the lower portion of the two-part sleeve is completely disposed within the mounting hole defined in the bridge deck and covered with epoxy up to a point below the splice point of the two-part sleeve.

12. A system for installing and removing a temporary concrete barrier from a bridge deck, the temporary concrete barrier having at least one mounting opening, the system comprising:

a bolt having a bolt head having at least one side wall and a bolt shaft including a threaded portion;

a star washer having an inner portion, a large locking tab extending perpendicularly outward from the inner portion, a small locking tab extending perpendicularly outward from the inner portion in an opposite direction, and a plurality of stop tabs extending horizontally outward from the inner portion, the large locking tab pressed against the at least one side wall of the bolt head;

a flat washer having a washer body including a bolt shaft opening and a locking recess defined on one side of the washer body adjacent to the bolt shaft opening, the small locking tab of the star washer disposed in the locking recess;

a two-part sleeve including a cylindrical upper portion spliced together with a cylindrical lower portion at a splice point, the bolt shaft disposed within the inner portion of the star washer, the bolt shaft opening defined in the flat washer, and the upper and lower portions of the two-part sleeve;

a barbed nut having a nut body including a threaded inner portion and barbs extending outward from the nut body, the threaded portion of the bolt shaft disposed within the threaded inner portion of the barbed nut; and wherein the barbed nut is disposed within a mounting hole defined in the bridge deck and partially covered with epoxy included in the mounting hole, the two-part sleeve is partially disposed within the mounting hole adjacent to the barbed nut and partially covered with epoxy included in the mounting hole, the lower portion of the two-part sleeve is partially covered with the epoxy included in the mounting hole, the upper portion of the two-part sleeve is partially disposed within the mounting opening defined in the concrete barrier and the mounting hole defined in the bridge deck, and the lower portion of the two-part sleeve is completely disposed within the mounting hole defined in the bridge deck and covered with epoxy up to a point below the splice point of the two-part sleeve.

13. A method of installing and removing a temporary concrete barrier having at least one mounting opening from a bridge deck utilizing the system of claim 1, the method comprising the steps of:

positioning the concrete barrier at a desired location on the bridge deck;

drilling a mounting hole in the bridge deck adjacent to and underneath the mounting opening defined in the concrete barrier using the mounting opening as a guide;

partially filling the mounting hole with epoxy;

inserting the barbed nut and two-part sleeve into the mounting opening, mounting hole, and epoxy so that the barbed nut is located in a bottom portion of the mounting hole and is partially covered with epoxy, the lower portion of the two-part sleeve is partially covered with epoxy, the upper portion of the two-part sleeve is partially disposed within the mounting opening and the mounting hole, and the splice point located between the upper and lower portions of the two-part sleeve is disposed within the mounting hole;

inserting the bolt shaft included with the bolt into the two-part sleeve partially disposed within the mounting opening and the mounting hole so that the threaded portion of the bolt shaft is adjacent to the threaded inner portion of the barbed nut; and partially tightening the system by partially threading the threaded portion of the bolt shaft into the threaded inner portion of the barbed nut.

14. The method of claim 13, further comprising the steps of:

waiting for the epoxy in the mounting hole to set;

continuing to tighten the system by continuing to thread the threaded portion of the bolt shaft into the threaded inner portion of the barbed nut until the bolt head, star washer, and flat washer press the concrete barrier against the bridge deck and hold the concrete barrier in place with respect to the bridge deck.

15. The method of claim 14, further comprising the step of cleaning the mounting hole with compressed air.

16. The method of claim 15, further comprising the step of inserting the small locking tab included with the star washer into the locking recess defined in the flat washer.

17. The method of claim 16, further comprising the step of sliding the star and flat washers onto the bolt shaft and against the bolt head.

18. The method of claim 17, further comprising the steps of:

loosening the system by unthreading the threaded portion of the bolt shaft from the threaded inner portion of the barbed nut;

removing the bolt shaft from the two-part sleeve;

removing the star and flat washers from the concrete barrier;

lifting the concrete barrier off of the upper portion of the two-part sleeve;

removing the upper portion of the two-part sleeve from the mounting hole; and filling the mounting hole with epoxy until the epoxy is flush with an upper surface of the bridge deck.

* * * * *